US012807381B1

(12) United States Patent
Meier et al.

(10) Patent No.: US 12,807,381 B1
(45) Date of Patent: Nov. 24, 2026

(54) SUPPLEMENT DELIVERY SYSTEMS AND METHOD OF USE

(71) Applicant: AONIC INC., San Francisco, CA (US)

(72) Inventors: Max Josef Meier, Mill Valley, CA (US); David Bostonian Jan, Tustin, CA (US)

(73) Assignee: AONIC, INC., San Francisco, CA (US)

(*) Notice: Subject to any disclaimer, the term of this patent is extended or adjusted under 35 U.S.C. 154(b) by 0 days.

(21) Appl. No.: 19/370,468

(22) Filed: Oct. 27, 2025

(51) Int. Cl.

| | |
|---|---|
| ***A61J 1/03*** | (2023.01) |
| ***B65D 8/00*** | (2006.01) |
| ***B65D 41/04*** | (2006.01) |
| ***B65D 51/20*** | (2006.01) |
| ***B65D 51/28*** | (2006.01) |

(52) U.S. Cl.
CPC ................ *B65D 51/28* (2013.01); *A61J 1/03* (2013.01); *B65D 11/02* (2013.01); *B65D 41/045* (2013.01); *B65D 51/20* (2013.01); *B65D 2251/0031* (2013.01); *B65D 2251/0059* (2013.01); *B65D 2251/0093* (2013.01)

(58) Field of Classification Search
CPC ........................................................ A61J 1/03
See application file for complete search history.

(56) References Cited

U.S. PATENT DOCUMENTS

| | | | | |
|---|---|---|---|---|
| 6,419,081 | B1 | 7/2002 | Ross | |
| 2002/0121454 | A1 | 9/2002 | Ross | |
| 2004/0219274 | A1* | 11/2004 | Cook .................... | A23C 9/158 426/590 |
| 2005/0258054 | A1 | 11/2005 | Arquilla | |
| 2018/0280333 | A1* | 10/2018 | Beaudoin ............... | A61Q 19/00 |

* cited by examiner

*Primary Examiner* — Stephen J Castellano

(57) ABSTRACT

A supplement delivery system includes a two-compartment container, having a first compartment containing a component of the system in liquid form, and a second compartment containing a component of the system in powder or encapsulated form, e.g., capsules and/or soft gels. In some implementations the container is cylindrical, and the two compartments are coaxially aligned.

17 Claims, 3 Drawing Sheets

SUPPLEMENT DELIVERY SYSTEMS AND METHOD OF USE

BACKGROUND

Nutritional supplements can be valuable in maintaining and improving good health and wellbeing. Supplements can also be beneficial to individuals suffering from nutritional deficiencies and to athletes seeking to optimize their fitness and performance.

However, individuals may find it difficult to regularly take a regimen of supplements due to factors such as an aversion to taking multiple pills, inconvenience, bad taste or digestive side effects of certain supplements, difficulty remembering which supplements to take, and/or inconvenience. Fish oil is but one example of a supplement the bad taste of which is an impediment to delivery; individuals who need to supplement with fish oil go to great lengths, including taking the fish oil capsules frozen.

SUMMARY

The present disclosure features supplement delivery systems that allow users to easily and conveniently take a predetermined combination of supplements, provided in predetermined quantities, without the need to remember what to take. In some cases, the delivery system contains a combination of supplements in concentrations that provide an appropriate daily dose of an "all in one" supplement formulation. The delivery systems also minimize exposure to bad tasting ingredients or ingredients that cause digestive side effects such as burping or delayed aftertaste.

The supplement delivery system includes a two-compartment container, having a first compartment containing a component of the system in liquid form, and a second compartment containing a component of the system in encapsulated or powder form, e.g., capsules and/or soft gels. Providing the components in separate compartments, and in some implementations in separate delivery forms (e.g., one or more capsules and soft gels) within the second compartment, prevents undesirable interaction between ingredients in the different components.

Because one component of the system is provided in liquid form that component can be used by the user to facilitate swallowing of the dry (encapsulated or powder) component(s) of the system. All of the components of the system are taken at once, ensuring that the user does not need to remember the amount to take or remember to take another dose later.

In one aspect, the disclosure features a supplement delivery system that includes a two-part container formed of a rigid, water and airtight material, the container having a first compartment containing a first supplement composition in aqueous solution and a second compartment containing a second supplement composition in solid (powder or encapsulated) form.

Some implementations include one or more of the following features.

The two-part container may be cylindrical. The two compartments may be coaxially arranged. The second compartment may serve as a lid for the first compartment, in which case the first compartment may have a threaded rim, and the second compartment may have a lower ring portion having a complementarily threaded inner surface. The second compartment may have a removable cap, for example a threaded cover. The first compartment may be formed of a transparent or translucent material and the second compartment may be formed of an opaque material.

The first supplement composition may contain a plurality of supplements that have a pleasant or neutral taste and that are water soluble. For example, the first supplements may contain a blend of vitamins, for example B vitamins that meet these criteria, e.g., B3, B5, B6, B7, B9, and B12) and Vitamin C; a dietary fiber, such as inulin; an anti-inflammatory, such as turmeric (a natural source of curcumin); and an antioxidant, such as Coenzyme Q10 (CoQ10). These ingredients are provided in safe concentrations and dissolved in a sufficient quantity of water to provide a drinkable solution in an amount that can be used to take the second supplement composition. The second compartment is sized to contain a single dose of the first supplement composition.

The second supplement composition can be divided into two sub-compositions, a first sub-composition that is a mixture of ingredients that are oily or oil soluble and are suitable for delivery in one or more soft gels, and a second sub-composition that is a mixture of ingredients that are not oil soluble and not suitable for delivery in the liquid component. In some embodiments the second sub-composition is provided in capsule form.

In some embodiments the first sub-composition comprises Omega-3 fatty acids, for example provided in the form of fish oil. The first sub-composition can also include oil-soluble vitamins and minerals.

The second sub-composition may include non-oil soluble vitamins, probiotics, zinc and antioxidants.

The disclosure also features a method of delivering supplements to a human user, which includes providing a supplement delivery system that includes a two-part container formed of a rigid, water and airtight material, the container having a first compartment containing a first supplement composition in aqueous solution and a second compartment containing a second supplement composition in powder or encapsulated form.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DETAILED DESCRIPTION

In some implementations the disclosure features supplement delivery systems that include a two-part container that has two compartments. One compartment is pre-charged with a liquid supplement formulation while the other contains one or more other supplement formulations that are provided in powder or encapsulated form. In some implementations the supplement formulations may be formulated to provide a daily dose of an "all in one" type supplement. The container itself and the components in each compartment will be discussed in turn below.

Two-Part Container

Figure 1:
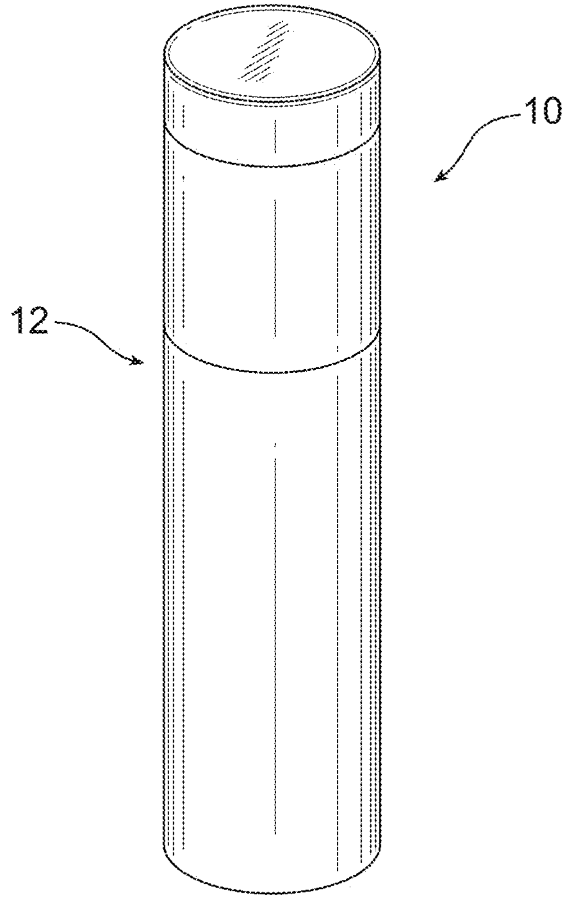
FIG. 1 is a perspective view of a supplement delivery system according to one implementation.
Figure 2:
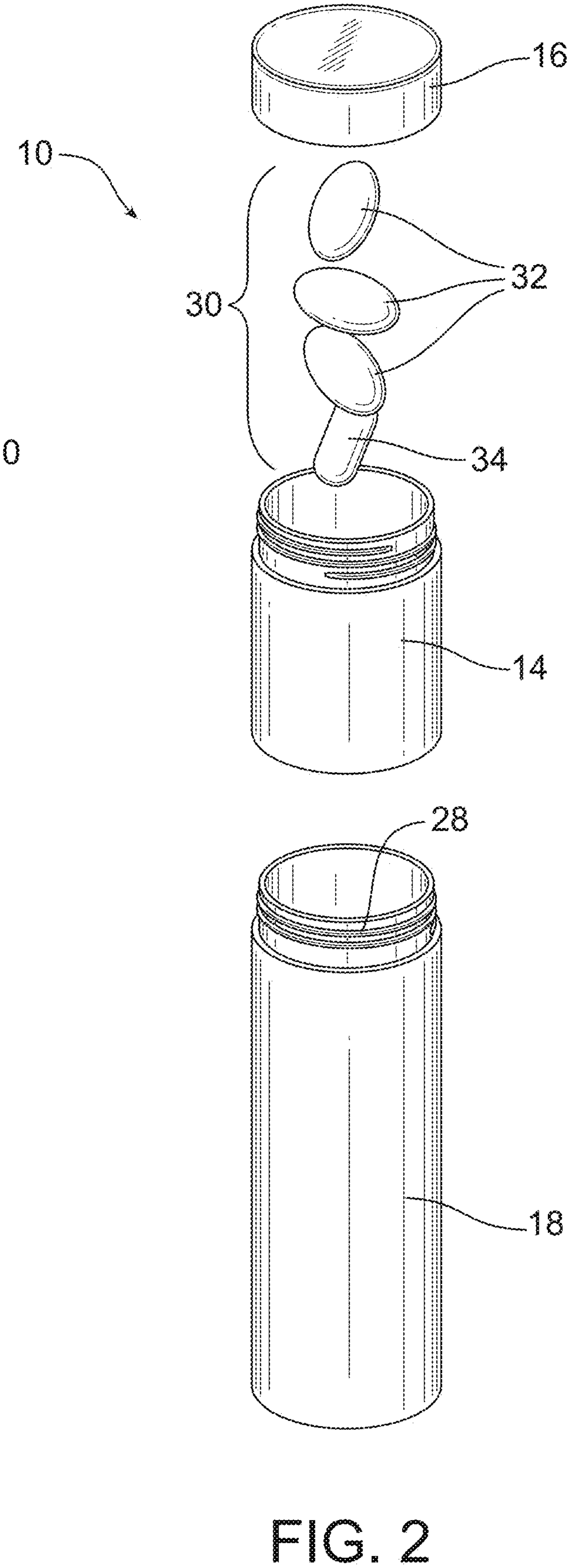
FIG. 2 is an exploded schematic perspective view showing the components of the system shown in FIG. 1.
Figure 3:
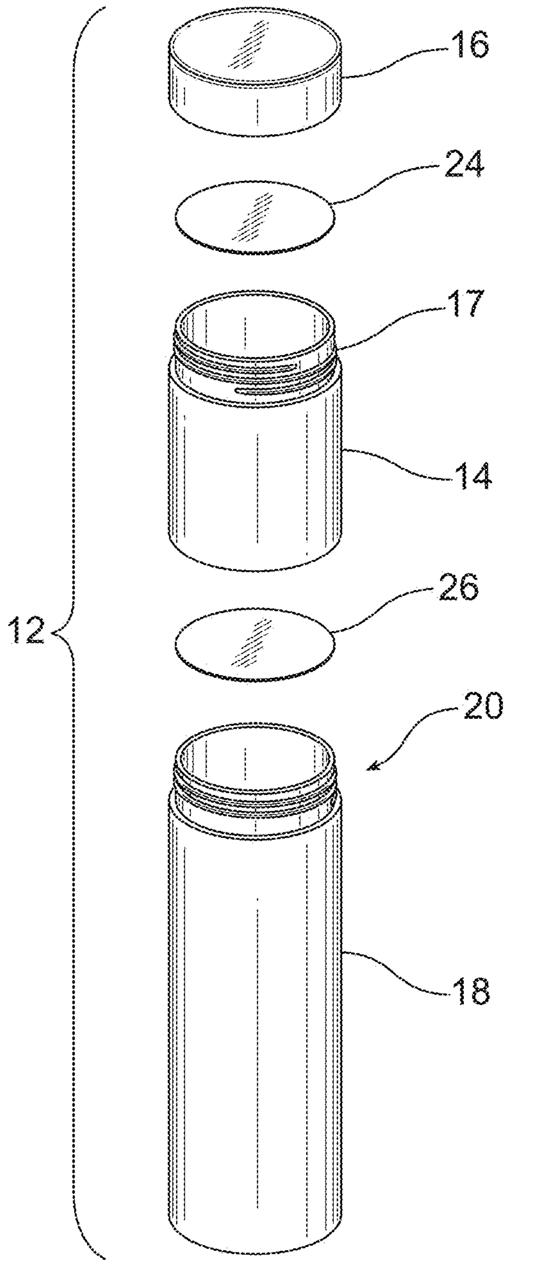
FIG. 3 is an exploded perspective view of the two-part container shown in FIG. 1.
Figure 4:
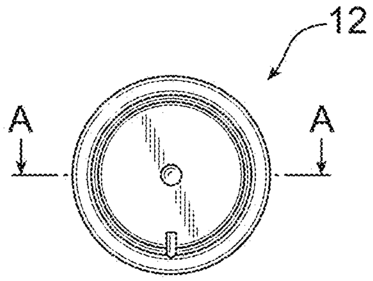
FIG. 4 is a bottom view of the container.
Figure 4A:
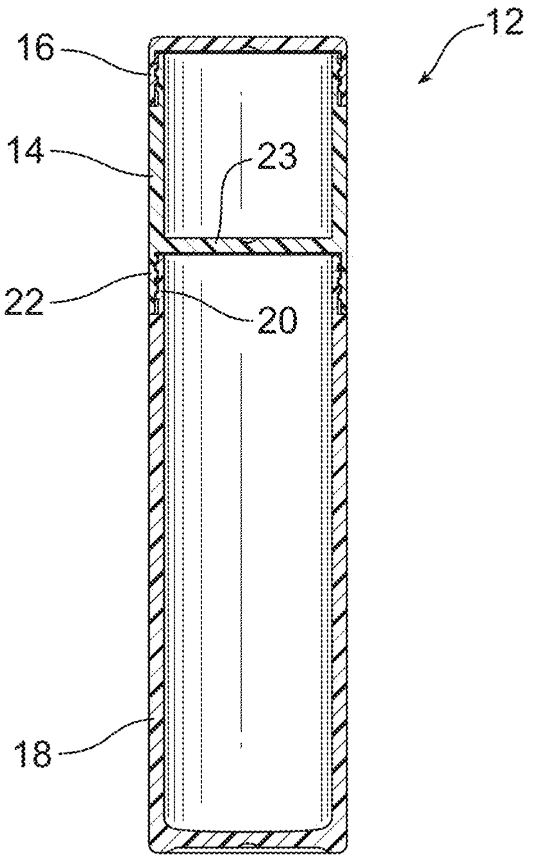
FIG. 4A is a cross sectional view taken along line A-A in FIG. 4.
Figure 5:
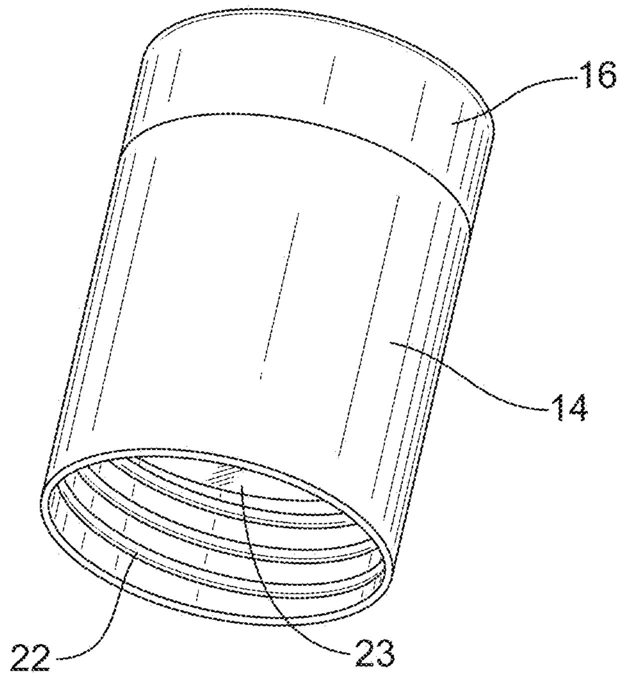
FIG. 5 is a perspective view of the upper compartment in isolation, viewed from below.

Referring to FIGS. 1-3, a supplement delivery system 10 includes a two-part container 12. Referring to FIG. 3, the two-part container 12 includes an upper compartment 14 having a threaded cover 16 that engages threaded rim 17 of the upper compartment. The container 12 also includes a lower compartment 18 that has a threaded rim 20 that is configured for threaded engagement with a threaded lower rim 22 extending from the bottom 23 of the upper compartment 14 (see FIGS. 4A and 5). The threaded rims 20 and 22 preferably only have a single thread, to allow the user to easily remove the upper container from the lower container, in some cases with one hand. The threaded cover 16 and corresponding rim 17 of the upper compartment 14 also preferably have a single thread to facilitate one handed opening.

Optionally, for product safety and to prevent liquid spillage, the openings of the upper and/or lower compartments can include peelable seals 24 and 26, respectively.

Referring now to FIG. 2, the supplement delivery system 10 also includes a liquid supplement component 28 disposed in the lower compartment 18, and encapsulated supplement components 30 disposed in the upper compartment 14. In the illustrated embodiment, the encapsulated supplement components include three soft gels 32 and a single capsule 34.

In the illustrated embodiment the upper compartment is opaque, to protect the contents from light and for privacy of the user, while the lower compartment is transparent or translucent so user can see liquid level. The container is preferably formed of plastic or other easily moldable, rigid and watertight material. In some cases, the container may be formed of an environmentally friendly plastic substitute such as a plant-based bioplastic.

To allow the container to be easily stored and transported by the user, for example in a pocket or handbag, it is preferred that the container be no larger than necessary to store the single dose of supplements. In some implementations, the container has a height of about 3 to 6 inches, preferably about 4 to 5 inches, and a diameter of about 0.75 to 1.25 inches. The height of the upper compartment can be, for example, from about 0.75 to 1.25 inches, while the height of the lower compartment can be from about 3 to 4 inches.

The volume of the lower compartment should generally be sufficient to contain from about 0.5 to 1.5 ounces, or in some cases 0.8 to 1.2 ounces, of the liquid supplement component. The volume of the upper compartment is selected to accommodate the necessary number of soft gels and/or capsules for a single dose of the encapsulated supplement component, in the illustrated embodiment the three soft gels and one capsule. The volume of the upper compartment may be, for example, from about 0.5 to 1.5 $in^3$.

Liquid Component

The liquid component is generally an aqueous solution. Ingredients that do not have an unpleasant taste, are water soluble, and can be safely delivered to the stomach are provided in the liquid component. It is also desirable to include ingredients that meet these requirements and that would require a number of capsules to deliver the same dose in encapsulated form, for example dietary fiber.

Preferably, the ingredients are dissolved in a sufficient quantity of water to provide a drinkable solution in an amount that can be used to take the second supplement composition, i.e., to help the user swallow the soft gels and capsule if water is not readily available.

In a preferred embodiment, the liquid component includes some or all of the following ingredients: Vitamin C, Vitamin B3, Vitamin B5, Vitamin B6, Vitamin B7, Vitamin B9, Vitamin B12, Inulin, Turmeric (curcumin), and Coenzyme Q10 (CoQ10). In some implementations these ingredients may be provided in concentrations in the following ranges:

Vitamin C (50-200 mg)
Vitamin B3 (10-30 mg)
Vitamin B5 (10-40 mg)
Vitamin B6 (5-20 mg)
Vitamin B7 (2-10 mg)
Vitamin B9 (0.5-4 mg DFE)
Vitamin B12 (0.05-0.3 mg)
Inulin (2-10 g)
Turmeric (curcumin) (bioequivalent to 200-1000 mg)
Coenzyme Q10 (bioequivalent to 100-400 mg).

The liquid component may include, in addition to or instead of the above components, one or more of the following: fruit juices not from concentrate (NFC), for example orange, passion fruit, pineapple, lime, or raspberry; sweeteners such as allulose, *stevia*, monk fruit, maltodextrin, and cane sugar; pH modifiers, such as citric acid, phosphoric acid, and tripotassium citrate; minerals, such as dimagnesium malate, zinc bisglycinate, and chromium picolinate; essential nutrients such as choline bitartrate; dietary ingredients such as pyrroloquinoline quinone (PQQ); protein supplements/sources of calcium, for example Milk Protein Isolate 90 Low Lactose, Calcium Caseinate, and Lactose Free Skimmed Milk Powder; flavorings such as sea salt, alkalized cocoa powder, natural chocolate flavor, cola flavor, natural orange flavor, and other natural flavors; colorants such as caramel color and other food colorings; thickeners such as soluble tapioca fiber, gellan gum, silicon dioxide, xanthan gum, acacia gum, and carrageenan; preservatives, such as potassium sorbate and mushroom glycolipids; stabilizers, such as dipotassium phosphate, and sodium hexametaphosphate; and stimulants such as caffeine.

The total concentration of the ingredients in the aqueous solution is selected to provide the desired individual concentrations while including a sufficient amount of water to avoid excessive precipitation of the ingredients. In some implementations the total concentration may be from about 10 to 25% solids w/w, in some cases from about 15 to 20% solids w/w. If a higher concentration is desired the user may be instructed to gently shake the container prior to drinking the liquid.

If juice or other water-containing liquid ingredients are used in the liquid composition the amount of added water may be reduced or eliminated.

Encapsulated Component(s)

The encapsulated components of the system are generally ingredients that have an unpleasant taste or aftertaste, are not water soluble, and/or should be delivered to the small intestine rather than the stomach. If ingredients are included that should be delivered to the intestine the capsule(s) and/or soft gel(s) are enteric coated, in some cases double enteric coated.

In the illustrated embodiment, the second supplement composition is provided as two sub-compositions, a first sub-composition that is a mixture of ingredients that are oily or oil soluble and are suitable for delivery in one or more soft gels, and a second sub-composition, in capsule form, that is a mixture of ingredients that are neither oil soluble nor suitable for delivery in the liquid component.

A major ingredient of the first sub-composition is Omega-3 fatty acids, which may be in the form of fish oil or oil from vegetable sources. The first sub-composition also includes oil-soluble vitamins and minerals, which are mixed with the fatty acids to form a paste. In addition to the fatty acids the first sub-composition may include, for example, iodine, selenium, copper, manganese, chromium, molybdenum, Vitamin A, Vitamin D3, Vitamin E, Vitamin K1, Vitamin K2, and Tributyrin.

The second sub-composition may include, for example, non-oil soluble vitamins that do not taste good in liquid solution, probiotics, zinc and antioxidants. In some implementations the second sub-composition includes Vitamin B1, Vitamin B2, zinc, *Bacillus subtilis, Bacillus clausii, Bacillus coagulans*, Pyrroloquinoline quinone (PQQ or methoxatin), and an antioxidant blend of extracts of greens, fruits and vegetables.

In some implementations these ingredients may be provided in concentrations in the following ranges:

Vitamin B1 (2-15 mg)
Vitamin B2 (2-15 mg)
Zinc (10-40 mg)
*Bacillus subtilis* (2-10 B CFU)
*Bacillus clausii* (2-10 B CFU)
*Bacillus coagulans* (2-10 B CFU)
Pyrroloquinoline quinone (PQQ or methoxatin) (10-40 mg)
antioxidant blend (50-200 mg).

If the supplement delivery system is intended for men, the second sub-component may also include ingredients that are particularly helpful for male health, for example boron (e.g., 3 to 12 mg) and lycopene (e.g., 5 to 30 mg), while if it is intended for women it may also include women-specific ingredients such as cranberry extract 40% proanthocyanidins (e.g., 50 to 200 mg) and hyaluronic acid (e.g., 50 to 200 mg).

The composition(s) provided in the upper compartment may include one or more of the following optional components: creatine monohydrate; hydroxymethylbutyrate (HMB); beetroot extract; digestive enzymes; probiotics; ginger; hibiscus powder/extract; hawthorn berry extract; grapeseed extract; natto fermented powder; resveratrol powder; caffeine; green tea; L-Theanine; L-Tyrosine; guayusa; theobromine; gotu kola; whey protein isolate or concentrate; and flavorings and sweeteners such as sea salt, *stevia*, monk fruit, alkalized cocoa powder, and natural chocolate flavor. Any suitable excipients can also be included for formulation and delivery of the composition as is well known in the pharmaceutical and nutraceutical arts.

Method of Use

A user can take the supplement compositions in any desired order. However, it is typically convenient for the user to remove the cover of the upper compartment, empty the contents of the upper compartment (e.g., the soft gels and capsule) into his or her hand, then remove the upper compartment from the lower compartment and swallow the soft gels and capsule while drinking the liquid component. Because the supplement delivery system contains only a single dose of the supplements the container can then be disposed of or recycled.

OTHER EMBODIMENTS

A number of embodiments have been described. Nevertheless, it will be understood that various modifications may be made without departing from the spirit and scope of the disclosure.

For example, while capsules and soft gels have been described as the delivery methods for the second supplement composition, in some cases enteric coated tablets or other types of pills could be used. In some cases, the second supplement composition can be provided as a powder, for example if it does not contain bad tasting ingredients or ingredients that should bypass the stomach.

Also, while the illustrated embodiment includes three soft gels and a single capsule, to allow a relatively large dose of Omega 3 Fatty Acids to be delivered, in other implementations the number of soft gels and capsules can be different.

Moreover, while it is typically preferred that the first, liquid component be stored in the bottom compartment of the container, if desired the larger compartment could be the top compartment and could contain the liquid component.

While preferred compositions have been described above, other types of supplement compositions could be used in the containers described herein. For user convenience and safety it is generally preferred that the supplement delivery system only contain a single dose of each of the supplement compositions.

Accordingly, other embodiments are within the scope of the following claims.

What is claimed is:

1. A supplement delivery system comprising:
a two-part container formed of a rigid, water and airtight material, the container having a first compartment and a second compartment;
a first supplement composition in aqueous solution disposed in the first compartment, and
a second supplement composition in powder or encapsulated form disposed in the second compartment, wherein the second supplement composition is provided as two sub-compositions:
a first sub-composition that is a mixture of ingredients that are oily or oil soluble and are suitable for delivery in one or more soft gels, the mixture comprising oil-soluble vitamins, minerals, and Omega-3 fatty acids in a form of fish oil, and
a second sub-composition that is a mixture of ingredients that are not oil-soluble and not suitable for delivery in the aqueous solution.

2. The supplement delivery system of claim 1 wherein the two-part container is cylindrical.

3. The supplement delivery system of claim 2 wherein the two compartments are coaxially arranged.

4. The supplement delivery system of claim 1 wherein the second compartment serves as a lid for the first compartment.

5. The supplement delivery system of claim 4 wherein the first compartment has a threaded rim, and the second compartment has a lower ring portion having a complementarily threaded inner surface.

6. The supplement delivery system of claim 5 wherein the first compartment and second compartment are joined by a single thread.

7. The supplement delivery system of claim 1 wherein the second compartment has a removable cap.

8. The supplement delivery system of claim 1 wherein the first compartment is formed of a translucent or transparent material, and the second compartment is formed of an opaque material.

9. The supplement delivery system of claim 1 wherein the first supplements are selected from the group consisting of vitamins, a dietary fiber, anti-inflammatories, antioxidants, and mixtures thereof.

10. The supplement delivery system of claim 1 wherein the first supplements are dissolved in a sufficient quantity of water to provide a drinkable solution in an amount that can be used to take the second supplement composition.

11. The supplement delivery system of claim 1 wherein the second supplement composition is provided in the form of capsules and/or softgels.

12. The supplement delivery system of claim 1 wherein the second sub-composition is provided in capsule form.

13. The supplement delivery system of claim 1 wherein the first and second compartments have first and second openings, and the container further comprises removable seals covering the openings.

14. The supplement delivery system of claim 1 wherein the second supplement composition is non-aqueous.

15. A method of delivering supplements to a human user, the method comprising:

providing a supplement delivery system that includes a two-part container formed of a rigid, water and airtight material, the container having a first compartment containing a first supplement composition in aqueous solution and a second compartment containing a second supplement composition in powder or encapsulated form, and providing the second supplement composition as two sub-compositions:

a first sub-composition that is a mixture of ingredients that are oily or oil soluble and are suitable for delivery in one or more soft gels, the mixture comprising oil-soluble vitamins, minerals, and Omega-3 fatty acids in a form of fish oil, and a second sub-composition that is a mixture of ingredients that are not oil-soluble and not suitable for delivery in the aqueous solution.

16. A supplement delivery system comprising:

a two-part container formed of a rigid, water and airtight material, the container having a first compartment and a second compartment;

a first supplement composition in aqueous solution disposed in the first compartment, and a second supplement composition in powder or encapsulated form disposed in the second compartment, wherein the second supplement composition is provided as two sub-compositions:

a first sub-composition that is a mixture of ingredients that are oily or oil soluble and are suitable for delivery in one or more soft gels, and a second sub-composition that is a mixture of ingredients that are not oil soluble and not suitable for delivery in the aqueous solution, and wherein the second sub-composition comprises non-oil soluble vitamins, probiotics, zinc and antioxidants.

17. A method of delivering supplements to a human user, the method comprising:

providing a supplement delivery system that includes a two-part container formed of a rigid, water and airtight material, the container having a first compartment containing a first supplement composition in aqueous solution and a second compartment containing a second supplement composition in powder or encapsulated form, and providing the second supplement composition as two sub-compositions:

a first sub-composition that is a mixture of ingredients that are oily or oil soluble and are suitable for delivery in one or more soft gels, and a second sub-composition that is a mixture of ingredients that are not oil soluble and not suitable for delivery in the aqueous solution, and wherein the second sub-composition comprises non-oil soluble vitamins, probiotics, zinc and antioxidants.

* * * * *